United States Patent [19]

Volk et al.

[11] Patent Number: 4,869,682
[45] Date of Patent: Sep. 26, 1989

[54] ELECTRICAL BRIDGING LINK FOR CONNECTING TERMINALS WITHIN A TERMINAL DEVICE

[75] Inventors: Thomas G. Volk, Grayslake; Albert Kupferschmidt, Highland Park, both of Ill.

[73] Assignee: Northern Telecom Limited, Montreal, Canada

[21] Appl. No.: 203,997

[22] Filed: Jun. 8, 1988

[51] Int. Cl.⁴ .............................................. H01K 4/50
[52] U.S. Cl. .................................... 439/344; 439/676; 439/715
[58] Field of Search ........ 439/695, 801, 815, 387–405, 439/412, 344, 676, 638, 701, 709, 712, 715, 727–729

[56] References Cited

U.S. PATENT DOCUMENTS

| | | | |
|---|---|---|---|
| 3,417,362 | 12/1968 | Reynolds | 439/676 |
| 4,315,664 | 2/1982 | Hughes et al. | 439/676 |
| 4,460,235 | 7/1984 | Gelin | 439/891 |
| 4,545,635 | 10/1985 | Bunnell | 439/404 |
| 4,576,428 | 3/1986 | DeLuca et al. | 439/271 |
| 4,606,595 | 8/1986 | Dola | 439/404 |
| 4,657,330 | 4/1987 | Levy | 439/402 |
| 4,738,635 | 4/1988 | Harrington | 439/676 |

Primary Examiner—David Pirlot
Attorney, Agent, or Firm—Foley & Lardner, Schwartz, Jeffery, Schwaab, Mack, Blumenthal & Evans

[57] ABSTRACT

A bridging link for connecting terminals in an electrical terminal device in which a body of the link provides a plug body for insertion into a telephone jack. Electrically conductive lines extend from terminal positions in the plug body to terminal positions spaced from the plug body. The conductive lines may be electrically conductive strips extending through passages which are preferably open at one side for lateral insertion of the strips. A latch arrangement is advantageously used to connect the link to the telephone jack and the latch arrangement is spaced from the plug body.

13 Claims, 3 Drawing Sheets

ELECTRICAL BRIDGING LINK FOR CONNECTING TERMINALS WITHIN A TERMINAL DEVICE

This invention relates to an electrical bridging link for connecting terminals within a terminal device.

In telecommunications networks, outside cables extend from central offices towards customer's premises and are connected to customer's inside telecommunications networks by the use of incoming cables (sometimes called "stub" cables). These extend from the outside cables into terminal devices comprising wall mounted terminal housings within the customer's premises. In all terminal housings used to connect incoming cables with customer's networks, and in what is commonly referred to as a "network interface", conductors of the incoming cables are terminated at one group of terminals and conductors of the internal network are terminated at another group of terminals. The terminals of one group are selectively connected with terminals of the other group by bridging links comprising short conductive lines within the housing. The incoming cable and the group of terminals at which it is terminated on the incoming side of the interface are the responsibility of the telephone company supplying the service to the customer and this group of terminals is normally located so as to be inaccessible to the customer. The types of terminals used in one or both groups are, however, of concern to a customer in that he needs to be able to connect his network into the terminal housing in a manner which most advantageously suits his purposes.

Certain terminal devices are designed for the purpose of enabling customers to be able easily to test lines of his own internal circuit. If, for instance, a customer has an operational problem in the use of his equipment, whether it is, for example, a telephone or a data processing terminal, he may wish to be able to discover quickly whether a fault exists in an internal line from the network interface in the terminal housing or in the equipment itself. It is now conventional for telecommunications equipment to be connected into a customer's inside network by a plug for a telephone jack, the plug secured at one end of a cable leading to the equipment and which may be inserted into the telephone jack provided in the same room as the equipment. To enable a customer's equipment to be operationally tested while avoiding the use of his own network, certain terminal devices have the group of terminals on the incoming side of the interface provided in the form of telephone jacks. A jack plug which connects a jack at the interface to the internal network may be released and a plug for an individual item of equipment inserted into the interface jack for test purposes.

In terminal devices having telephone jacks as the group of terminals on the incoming side of their network interfaces (i.e. connected to the incoming cable), the other group of terminals on the customer's network side of the interface is spaced from the incoming side and is located upon a terminal mounting. The two groups of terminals are connected together by bridging links in the form of short lengths of wire with plugs attached to the wires for insertion into the telephone jacks forming the terminals on the incoming side. Thus, at the interfacial region, these terminal devices include telephone jacks as one terminal group, another group of terminals at the customer network side of the interface together with the terminal mounting, and assemblies of plugs and cable lengths. In addition, during assembly, the cable lengths need to be connected to the group of terminals at the customer network side of the interface. Thus, a substantial number of parts need to be assembled together to provide the complete network interface together with assembly operations upon the terminal device itself which includes a strain relief for the wires to the plugs.

Complication is further caused in that seals are normally required to be placed over the telephone jacks and through which the plugs pass when being connected to the jacks. The purpose of the seals is to prevent atmospheric moisture within the customer's premises from contacting and deleteriously affecting the exposed conductor ends of the incoming cable and their electrical contact with the terminals of the telephone jacks. However, the reliability of these seals depends upon the degree of sealing which they have with the plugs. The sealing effect can only be provided between the sides of apertures in the seals (i.e. through the seal thickness) and the surfaces of the plugs which the seals surround. It has been found that this method of sealing is not particularly effective, especially when the jack plugs include resiliently movable release latches which extend through the seals. Gaps necessarily occur between the seals and these latches to allow for latch movement.

The present invention provides an electrical bridging link which is an improvement over that used conventionally and simplifies the network interface assembly of terminal devices used for connecting outside cables with customer's inside telecommunications networks.

The present invention provides a bridging link for connecting terminals within an electrical terminal device in which the link has a link body of electrically insulating material part of which is in the form of an extension which provides a plug body for insertion into a telephone jack. The link body has a set of plug terminal positions within the extension and another set of terminal positions spaced on the link body from the extension. Electrically conductive lines extend through the bridging link and each conductive line has a terminal at each end with one of its terminals located at a terminal position of the one set and the other terminal at a terminal position of the other set.

As can be seen, a bridging link of the invention provides a single assembly of link body, conductive lines and groups of terminals which, because of the use of the plug body extension, may be inserted or removed from a telephone jack as a single member. Thus, the whole bridging link is carried by the telephone jack thereby avoiding separate subassemblies of a plug and cable and a mounting carrying terminals for the internal network spaced away from the telephone jack. The preassembled bridging link may easily be located in position within a terminal device merely by connecting conductors of the internal network to one group of terminals and locating the extension forming the plug body into the telephone jack. Thus all the normal problems associated with assembling the complete structure in the interfacial region, e.g. mounting the terminals upon the separate mounting, locating this mounting within the terminal device, and assembling the plug and cable into position including the provision of a strain relief, is avoided. As a result of the present invention, less facial area of terminal device is necessary for providing the network interface, thereby enabling the terminal device to be made smaller as desired.

In preferred constructions, further advantages are found. In certain constructions, passages are defined within the body for the location of the conductive lines. It is convenient for the lines to be formed by strips of electrically conductive material. If the passages are open at the surface of the body, then the strips may be preformed to fit through the open sides of the passages thereby simplifying the assembly procedure.

It is also preferable for the link body to include releasable locking means spaced from the extension for attaching the link to the jack with the extension located within the jack. This releasable locking means should be spaced from the extension so as not to form part of it and if a seal is provided between the link body and the jack then this seal will be compressed through its thickness to prevent the passage of moisture to the extension and thus to the terminals within the jack for the incoming cable.

Embodiments of the present invention will now be described by way of example, with reference to the accompanying drawings, in which.

Figure 1:
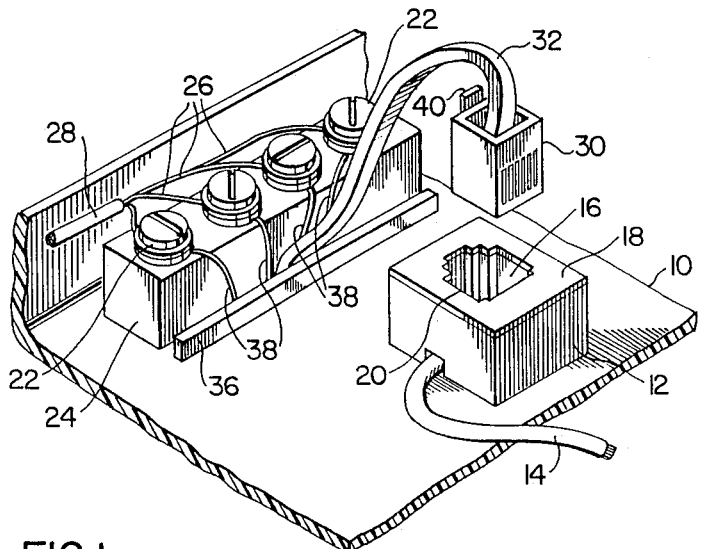
FIG. 1 is an isometric view showing a prior art arrangement for the interfacial region of a terminal device.

As shown in FIG. 1, a conventional network interface in a wall mounted terminal device comprises a telephone jack 12 mounted within a housing 10 of the device. The jack 12 is connected to a cable 14 coming into a customer's premises, the cable passing behind the jack as shown and having insulated conductors (not shown) connected to conventional leaf spring terminals projecting into the plug receiving aperture 16 of the jack. The jack has an elastomeric seal 18 attached to a flat surface of the jack body at which the aperture 16 opens, the seal having an orifice 20 substantially identical in size and shape to the aperture 16 and being aligned with the aperture so that the seal surrounds the aperture 16.

The conventional network interface also includes a set of terminals 22 on the customer's network side of the interface. These terminals 22 are screw terminals which are carried upon a terminal mounting block or bridge 24 which is attached within the housing 10 in a position spaced from the jack 12 as shown in FIG. 1. Conductors 26 of a cable 28 forming part of the customer's network are connected with the terminals 22, the cable extending outwards from the housing.

A bridging link is used to interconnect the terminals 22 with the leaf spring terminals of the jack 12. The bridging link comprises a conventional plug 30 for insertion into the jack 12 and a short cable length 32 connected at one end to the plug. Thus, the network interface comprises the jack 12, the bridge 24 and its terminals 22, and the bridging link of plug 30 and cable length 32.

For accessability, the bridge 24 is spaced sufficiently from the jack 12 to enable the cable length 32 to be connected to the bridge and also to allow for free movement of the cable length. This free movement should be sufficient for insertion into and removal of the plug from the jack 12 to enable another plug (not shown) to be inserted into the jack for test purposes while short-circuiting the customer's network, the other plug connected directly by cable to end use equipment such as a telephone set or a data processing terminal. Connection of the cable 32 to the bridge 24 entails gripping the cable between a strain relief rib 36 and the bridge, and passing individual conductors 38 of the cable to the terminals 22 as shown in FIG. 1. Further, to prevent moisturized air inside the building from reaching the leaf spring terminals in the jack, a sealing effect between the seal 18 and the inserted plug 30 is only provided between the sides of the orifice 20 and the sides of the plug. Thus, to be effective, the seal needs to grip the plug closely. However, this is impossible because the plug 30 has a latch 40 which is resiliently movable towards and away from the plug body in known manner for the purpose of latching the plug to and releasing it from the jack. The latch movement does not permit the seal to grip it closely and normal gaps around the latch allow for the ingress of moisturized air.

The embodiment now to be described provides a bridging link which not only reduces the area required for the network interface within the terminal device while using a telephone jack at the incoming side of the interface, but also reduces the parts needed to be assembled into the housing while avoiding or reducing the disadvantages of the conventional structure.

As will be seen, this result is obtained in part by having a bridging link which includes, as part of a single assembly, a group of terminals on the customer's network side of the interface, the plug for the jack, and electrical connection from these terminals to the plug. In a first embodiment as shown in FIGS. 2, 3, 4, 5 and 6, a bridging link 44 comprises an integrally molded link body 46 of electrically insulating material, i.e. a suitable rigid plastic. The link body 46 is provided with a main or central stem 48 of rectangular or square cross-section, and two substantially planar walls 50 and 52. The wall 50 lies across one end of the stem and in a general plane normal to the stem main axis so that the wall 50 is substantially symmetrical on each side of the stem. The wall 52 extends in a plane parallel to that of the wall 50 and also lies symmetrically on each side of the stem. The body, which includes the stem 48 and walls 50 and 52, has an extension 54 which is axially in alignment with the end of stem 48 remote from the wall 50 and extends outwardly from the wall 52. The extension 54 forms a plug body for insertion into a telephone jack as will be described.

A group of terminal positions are provided by four screw-threaded bores 56 opening onto a face 58 of wall 50, the face 58 directed away from the stem 48, these terminal positions being on the customer's network side of the network interface for which the bridging link is to be used. The bores are separated along wall 50 by short partition walls 60 extending transversely of and projecting outwardly from the face 58. Terminal screws 62 having captive washers 64 are provided for clamping around bared conductor wires on the customer's network side of the interface. The screws 62 thread into the threaded bores 56 which pass through the wall 50 into bosses 68 which extend between and connect the walls 50 and 52.

Four molded-in passages 70 extend in parallel relationship along the stem 48 from another set of terminal positions 72 at the free end of extension 54. The passages 70 are directed one towards each terminal position of bores 56 with the innermost two of the passages in the stem opening at position 74, i.e. at the junction between either side of a central partition wall 60 and the face 58 of the wall 50. The outermost two passages 70 extend along the wall 50 to open at positions 76 between partition walls 60 and face 58.

Figure 2:
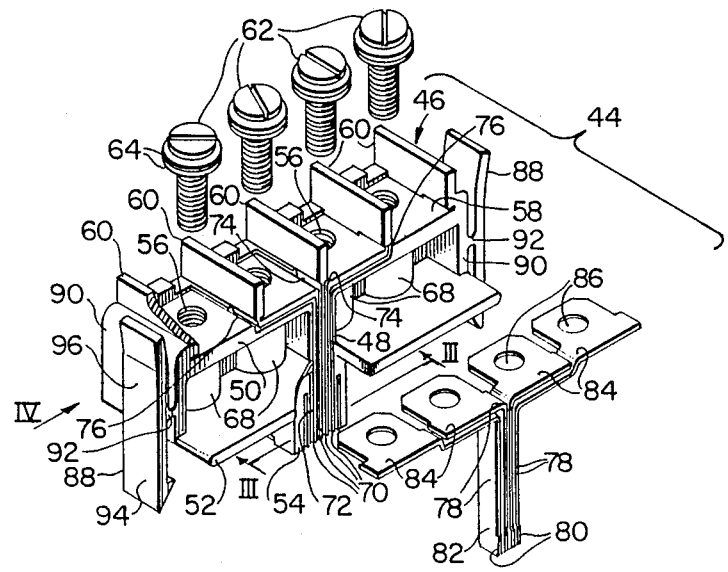
FIG. 2 is an isometric view of a bridging link of one embodiment showing it in exploded condition.
Figure 3:
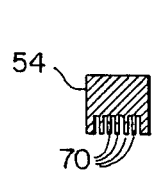
FIG. 3 is a cross-sectional view of part of the bridging link of the first embodiment taken along line III—III in FIG. 2.

As shown in FIG. 3, each of the passages 70 has a side open along one surface of the body 46 and conductive lines in the form of preformed strips 78 of electrically conductive material (i.e. copper) are insertable into the passages. Strips 78 are shaped so as to slide into their respective passages 72. A group of terminals is provided by the lower ends 80 of the strips 78. With the strips 78 in passages 70, the ends 80 are located in terminal positions within the extension 54 for engagement by cantilever spring terminal (not shown) of conventional construction disposed within a telephone jack to be described. As shown in FIG. 2, each of the strips 78 has a main conductive portion 82 for extending along a respective passage 72 in the main stem 48 of the body, ends of the strips 78 remote from the terminals 80 being bent at right angles to the main portion to provide terminal plates 84. The terminal plates 84 have holes 86 which are aligned with the holes 56 in the wall 50 for passage therethrough of the screws 62 when the plates 84 lie between partition walls 60 and against face 58 of wall 50.

Figure 4:
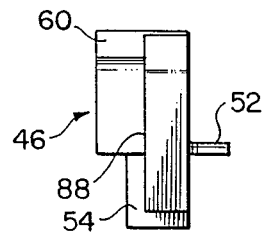
FIG. 4 is a side view of the bridging link of the first embodiment taken in the direction of arrow IV in FIG. 2.

As shown by FIG. 4, the extension 54 which forms the plug is devoid of a locking arm such as is normally used in telephone jacks and plugs (e.g. arm 40 in the first embodiment). To mount the bridging link onto a telephone jack, the bridging link is instead provided with a latching means. This latching means comprises two latches 88 disposed one at each end of the walls 50 and 52 and formed integrally with end walls 90 of the body 46. Latches 88 are resiliently attached to wall 90 by a resilient web 92. Each latch has a latching portion 94 extending in one direction from the neck 92, the latching portion 94 extending downwardly beyond the wall 52 so as to face towards the extension 54. Extending in the opposite direction from the neck 92 is a release lever portion 96 of the latch. The release lever portion 96 and latching portion 94 form a rigid member whereby movement of the release portion 96 towards the wall 90 about the neck 92 causes outward releasing movement of the latching portion 94.

Figure 5:
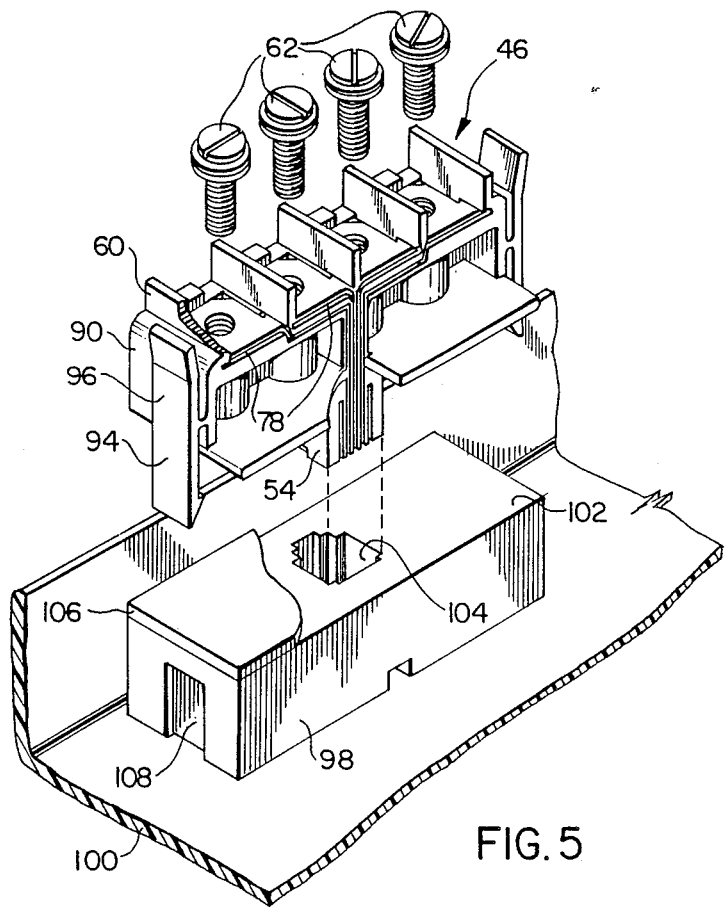
FIG. 5 is a view similar to FIG. 2 showing the bridging link in assembled condition and separated from a telephone jack.

As shown in FIG. 5, the strips 78 of conductive material are inserted into the passageways 70 and are held in position by the screws 62 passing through the holes 86 into the bores 56 of the walls 50. As can be seen, the bridging link structure is preassembled and is compact. The conductive strips 78 are completely protected by the material of the body while being easily assembled onto the body. The structure of the bridging link avoids the separate mounting and sub-assembly of a plug and cable onto a telephone jack as will be described.

Figure 6:
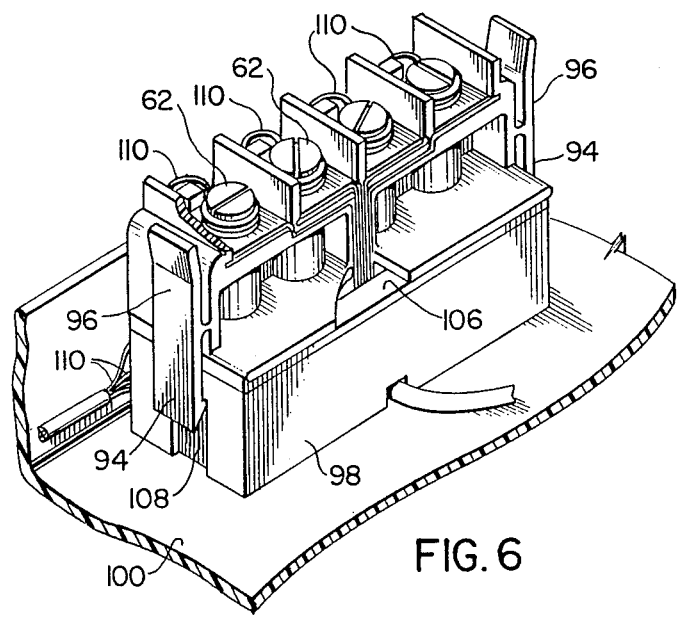
FIG. 6 is a view similar to FIG. 2 showing the assembled bridging link mounted upon the telephone jack to provide an arrangement for a network interface of a terminal device.

As shown in FIGS. 5 and 6, the bridging link is to be assembled onto a telephone jack 98 to complete a network interface in a wall mounted terminal device comprising a housing 100. The telephone jack 98 has a flat surface 102 surrounding the entrance to a socket 104 for the plug extension 54 of the bridging link. The socket 104 will accept and latch a conventional telephone plug or a standard plug used for testing. Disposed upon the surface 98 is a sealing gasket 106. At opposite ends of the telephone jack 98 so as to correspond in position with the latching portions 94, are two latching recesses 108 for accepting the latching portions and for holding the bridging link upon the telephone jack.

Upon assembly of the bridging link onto the telephone jack as shown in FIG. 6, the sealing gasket 106 is compressed between the surface 98 and the wall 52 of the bridging link so as to provide a substantial sealing effect completely around the extension 54 and around the entrance to the socket 104. This sealing effect prevents the ingress of moisture between the extension 54 and the entrance to the socket and the effectiveness of the seal is not affected by the presence of any releasing mechanism provided upon the extension 54 itself, as with conventional plug constructions. In this particular embodiment of course, the means for holding the bridging link onto the telephone jack is in the form of the latches 88 which are completely separate from the plug extension 54. As can be seen from FIG. 6, the latching portions 94 engage within the recesses 108 so as to complete attachment of link to telephone jack in a releasable manner by the provision of the release portions 96 of the latches.

It follows therefore that in the use of the bridging link of the embodiment, not only is the bridging link of compact design and avoids the separate mounting and sub-assembly of a plug and cable between two different sets of terminals, but also it allows for ease of insertion into the telephone jack and accommodates and latches standard plugs used in testing. In addition, the location of the latches at each side of the bridging link provides a balanced loading effect across the seal 106 to form an effective seal around the extension 54. The latches themselves are completely accessible to allow for ease of removal of the bridging link for maintenance or test purposes. Apart from the above advantages which assist in assembly of the bridging link into the housing 100, further advantages are provided in that less facial area of the housing is required to complete the network interface than with a conventional construction as described with reference to FIG. 1 and far fewer component parts are also required. This can be seen readily by a comparison of FIGS. 6 and 1. As shown in FIG. 6, the facial area for the complete network interface is substantially that of the telephone jack 98 which is superimposed by the bridging link when in the operational position with the conductors 110 of the customer's network extending from the screws 62 to the customer's equipment. On the other hand as shown in FIG. 1, the network interface not only includes the telephone jack, bridge 24 and plug 30 with cable length 32, but a sufficient distance is required between the jack 12 and bridge 24 to enable the cable to extend freely from the jack to the bridge. Undoubtedly the conventional arrangement occupies a substantially larger facial area of housing than that described in the first embodiment.

Figure 7:
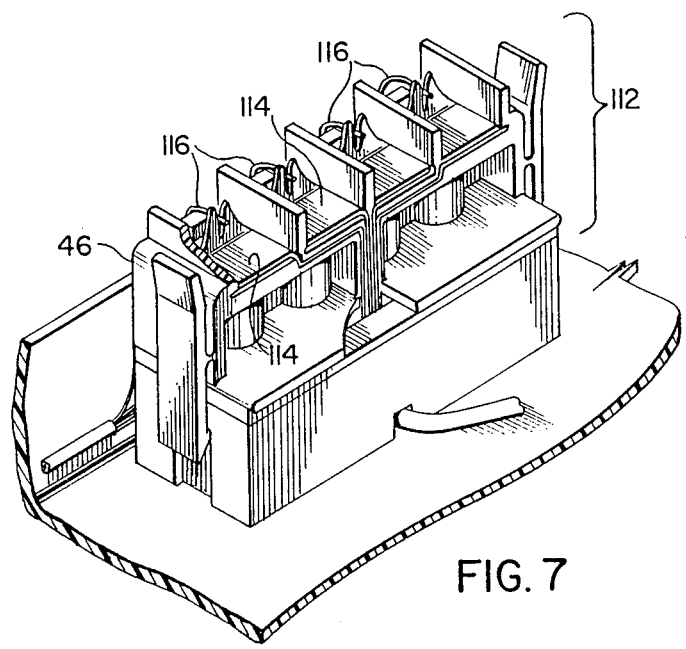
FIG. 7 is a view similar to FIG. 6 of a bridging link according to a second embodiment mounted upon a telephone jack.

In a second embodiment shown in FIG. 7, a bridging link 112 is of the same construction as in the first embodiment except that the screw terminals provided by screws 62 and the terminal plates 84 are replaced by insulation displacement terminals. The insulation displacement terminals are formed by bifurcated extensions 114 to ends of the conductive strips 78. The conductors 116 forming part of the customer's network are simply connected to the conductive strips 78 by inserting them into the insulation displacement terminals, i.e. between the bifurcated extensions 114, in conventional fashion for cutting and displacing the insulation on the conductors.

What is claimed is:

1. A bridging link for connecting terminals within an electrical terminal device comprising:
   a dielectric link body having a modular latch-free plug formed as an extension of the link body for insertion into a telephone jack;
   link body portions extending laterally in opposite directions from the plug and having a continuous surface surrounding the plug, a directional component of the surface facing along the plug for engagement of the surface with a seal surrounding the plug; and
   electrically conductive lines carried by the link body, each conductive line having one terminal located at one of a set of terminal positions carried by the plug and another terminal at a terminal position on the link body spaced from the plug;
   said link body portions having latch means to releasably attach the link to the jack, said latch means located solely in positions spaced from the plug by the continuous surface.

2. A bridging link according to claim 1 wherein the conductive lines extend through passages defined within the body.

3. A bridging link according to claim 1 wherein the conductive lines are provided by strips of electrically conductive material which extend through passages defined within the body.

4. A bridging link according to claim 3 wherein the passages have sides open at a surface of the body and the electrically conductive strips are inserted into the passages through the open sides.

5. A bridging link according to claim 3 wherein the terminal at one end of each electrically conductive strip is formed as an insulation displacement terminal.

6. A bridging link according to claim 3 wherein the terminal at one end of each electrically conductive strip is formed with a hole for terminal screw reception.

7. A bridging link according to claim 6 wherein the body is formed with a hole aligned with the hole in each strip for terminal screw reception.

8. A bridging link according to claim 1 wherein the latch means comprises latches extending from said link body portions and extending in the same direction as the extension plug.

9. A bridging link according to claim 8 wherein the body has a main stem in alignment with the plug and the link body portions comprise wall means comprising a first and second wall each of which extends in opposite directions laterally of the main stem and of the plug with the second wall spaced from the first wall on a side of the first wall remote from the plug, the latch means comprising latches extending from the wall means with the continuous surface provided by the first wall.

10. A bridging link according to claim 9 formed with passages which are open at sides of the body, extend up the stem from terminal positions of the one set in the plug, the passages turning to extend through the second wall towards terminal positions of the other set and the conductive lines are provided by strips of conductive material which are inserted into the passages through the open sides.

11. A bridging link according to claim 10 wherein the strips of conductive metal are preformed to the directional shape of the passages.

12. An electrical terminal device comprising:
   (a) a telephone jack comprising a dielectric jack body formed with a socket and having terminals disposed within the socket, the jack body having a continuous surface surrounding an entrance to the socket;
   (b) a bridging link comprising a dielectric link body having a modular latch-free plug formed as an extension of the link body for insertion into the socket of the telephone jack, link body portions extending laterally in opposite directions from the plug and together providing a continuous surface surrounding the plug with a directional component of the surface facing along the plug;
   (c) a compressible seal for location between said continuous surfaces in a position surrounding the plug and the entrance to the socket with the plug within the socket;
   (d) electrically conductive lines carried by the link body, each conductive line having one terminal located at one of a set of terminal positions carried by the plug and another terminal at a terminal position on the link body spaced from the plug; and
   (e) interengageable latch means for releasably attaching the link to the jack with the plug within the socket and with the seal being compressed between said continuous surfaces of jack body and of the link body portions, said latch means located solely in positions spaced from the plug and the jack socket entrance by the continuous surfaces.

13. An electrical terminal device according to claim 12 wherein the interengageable latch means comprises latches provided laterally one at each side of and spaced from the extension, and latch engaging surfaces on the jack body.

* * * * *